(12) United States Patent
Snyder

(10) Patent No.: US 6,351,934 B2
(45) Date of Patent: Mar. 5, 2002

(54) FORCED PURGE WAVE ROTOR

(75) Inventor: Philip H. Snyder, Plainfield, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 09/315,003

(22) Filed: May 19, 1999

Related U.S. Application Data

(63) Continuation of application No. 08/857,529, filed on May 16, 1997, now Pat. No. 5,916,125.

(51) Int. Cl.$^7$ .............................................. F02C 3/02
(52) U.S. Cl. ...................................... 60/39.02; 60/39.45
(58) Field of Search ............................. 60/39.02, 39.45

(56) References Cited

U.S. PATENT DOCUMENTS

| | | |
|---|---|---|
| 2,738,123 A | 3/1956 | Hussmann |
| 2,757,509 A | 8/1956 | Jendrassik |
| 2,759,660 A | 8/1956 | Jendrassik |
| 2,764,340 A | 9/1956 | Jendrassik |
| 2,766,928 A | 10/1956 | Jendrassik |
| 2,852,915 A | 9/1958 | Jendrassik |
| 2,864,237 A | 12/1958 | Coleman, Jr. |
| 2,901,163 A | 8/1959 | Waleffe |
| 2,937,498 A | 5/1960 | Schmidt |
| 2,940,656 A | 6/1960 | Spalding |
| 2,946,184 A | 7/1960 | Jendrassik |
| 2,952,986 A | 9/1960 | Spalding |
| 2,970,745 A | 2/1961 | Berchtold |
| 3,003,315 A | 10/1961 | Spalding |
| 3,078,034 A | 2/1963 | Spalding |
| 3,084,511 A | 4/1963 | Klapproth |
| 3,095,704 A * | 7/1963 | Spalding .................... 60/39.45 |
| 3,234,736 A | 2/1966 | Spalding |
| 3,417,564 A | 12/1968 | Call |
| 3,483,697 A | 12/1969 | Ruffles et al. |
| 3,486,686 A | 12/1969 | Williamson |
| 3,879,937 A | 4/1975 | Jenny |
| 3,899,874 A | 8/1975 | Bailey et al. |
| 4,241,576 A | 12/1980 | Gertz |
| 4,679,393 A | 7/1987 | Hellat et al. |
| 4,719,746 A | 1/1988 | Keller |
| 4,912,924 A | 4/1990 | Stockwell |
| 5,197,276 A | 3/1993 | Keller |
| 5,220,781 A * | 6/1993 | Keller ....................... 60/39.02 |
| 5,267,432 A | 12/1993 | Paxson |
| 5,274,994 A | 1/1994 | Chyou et al. |
| 5,297,384 A | 3/1994 | Paxson |
| 5,313,785 A | 5/1994 | Althaus et al. |
| 5,353,589 A | 10/1994 | Althaus et al. |
| 5,522,217 A | 6/1996 | Zauner |
| 5,557,919 A | 9/1996 | Althaus |
| 5,894,719 A * | 4/1999 | Nalim et al. ................ 60/39.02 |

OTHER PUBLICATIONS

Article entitled "A Modified Through–Flow Wave Rotor Cycle With Combustor Bypass Ducts: Preliminary Report", Daniel E. Paxson and M. Razi Nalim, NASA Technical Memorandum 107420, Feb. 1997, pp. 1–6.

Article entitled "Wave Rotor–Enhanced Gas Turbine Engines", Gerard E. Welch, Scott M. Jones and Daniel E. Paxson, NASA Technical Memorandum 106998, AIAA–95–2799, Army Research Laboratory, pp. 1–13.

* cited by examiner

*Primary Examiner*—Charles G. Freay
(74) *Attorney, Agent, or Firm*—Woodard, Emhardt, Naughton, Moriarty & McNett

(57) ABSTRACT

A wave rotor apparatus and method of using the transient gas dynamic processes within the wave rotor to accomplish an engine topping cycle. In one form of the present invention the wave rotor is a five port device. Working fluid from the highest pressure outlet port is routed to a port adjacent to and preceding an inlet port admitting air from the compressor. In a preferred form of the present invention there are two port sequences disposed along the circumference of the wave rotor apparatus.

7 Claims, 5 Drawing Sheets

FORCED PURGE WAVE ROTOR

The application is a continuation of commonly owned and allowed U.S. patent application Ser. No. 08/857,529 filed May 16, 1997, now U.S. Pat. No. 5,916,125, which is incorporated herein by reference.

BACKGROUND OF THE INVENTION

The present invention relates generally to a wave rotor apparatus and a method of using the transient gas dynamic processes within the wave rotor to accomplish an engine topping cycle. More particularly, in one embodiment of the present invention a portion of the gases in the highest pressure portion of the wave rotor based topping cycle are routed to a port adjacent to and preceding an inlet port admitting air from the compressor. Although the present invention was developed for use with a gas turbine engine, certain applications may be outside of this field.

A wave rotor is generally thought of as a generic term and describes a class of machines utilizing transient internal fluid flow to efficiently accomplish a desired flow process. Since the 1940's wave rotors have been studied by engineers and designers, and identified as particularly adapted for use in a gas turbine engine. Performance levels of gas turbine engines are enhanced by the integration of a wave rotor based topping cycle thereon.

Presently, a considerable amount of research is directed to improving the specific power and decreasing the specific fuel consumption of gas turbine engines. One approach to obtaining these goals is to raise the compressor pressure ratio (compressor exit pressure/compressor inlet pressure), and/or increase the combustor temperature. However, several constraints have inhibited the realization of an aircraft gas turbine engine having a significantly raised compressor pressure ratios and/or combustor temperatures.

Increasing the pressure ratio causes an increased gas density that often necessitates the use of smaller passages and blading. Associated with smaller passages and blading is an increased surface area that can cause decreased component efficiency related to frictional losses. Also associated with smaller passages and blading are losses related to increased blade tip leakages due to proportionately larger tip clearances. Therefore, all or a portion of the theoretical improvement and cycle efficiency attributed to the increase in the pressure ratio may be negated by the decrease in component efficiency. Current material limitations and cooling techniques for aircraft gas turbine engines have been inadequate to accommodate significantly increased operating temperatures, thus, inhibiting any significant working fluid temperature increase in the gas turbine.

Suitably designed wave rotors can function like key portions to conventional gas turbine engines to extract useful work by compressing and expanding the working fluid. However, unlike the conventional gas turbine engine that utilizes rotating airfoils, the transfer and extraction of energy in a wave rotor involves unsteady transient waves and flow processes. The wave rotor used in a cycle topping role allows an increase in the engine pressure ratio without suffering high losses. Simultaneously, the combustor exit temperature can be increased while using present material technology because the wave rotor has a self cooling feature occurring within it's passageways. The self cooling feature utilizes intermittently exposing individual passageway walls of the wave rotor to alternating elevated and reduced temperature gas flows, so that the thermal capacitance of the passageway walls can hold the average material temperature to an acceptable level.

Although prior wave rotors and methods of using transient gas flows are steps in the right direction, the need for additional improvements still remains. The present invention satisfied this need in a novel and unobvious way.

SUMMARY OF THE INVENTION

One embodiment of the present invention contemplates a combination of a gas turbine engine having a compressor and a turbine and a waver rotor comprising: a rotor having a plurality of passageways therethrough for gas flow; a plurality of sequential exit ports disposed in fluid communication with the rotor for receiving gas exiting the plurality of passageways, one of the plurality of exit ports being a first exit port having a pressure greater than the rest of the plurality of exit ports; a plurality of sequential inlet ports disposed in fluid communication with the rotor for allowing gas to flow into the plurality of passageways, one of the plurality of inlet ports being a compressor inlet port for receiving gas from the compressor; and a passageway coupled between the first exit port and a second of the plurality of inlet ports positioned adjacent to and prior the compressor inlet port for delivering gas to the rotor.

Another embodiment of the present invention contemplates a method utilizing a wave rotor to top a gas turbine engine's cycle. The method comprising: providing the wave rotor having a rotatable rotor with a plurality of fluid passageways for the passage of a working fluid therethrough; rotating the rotor so as to sequentially pass the plurality of fluid passageways by a plurality of wave rotor inlet ports and a plurality of wave rotor outlet ports; discharging a portion of the working fluid within at least one of the plurality of fluid passageways through one of the plurality of outlet ports, wherein the one outlet port having the highest pressure of any of the plurality of outlet ports; reducing the pressure of the portion of the working fluid after the discharging; and introducing the portion of the working fluid into one of the plurality of inlet ports after the reducing.

One object of one form of the present invention is to provide an improved wave rotor for a gas turbine engine.

Related objects and advantages of the present invention will be apparent from the following description.

DESCRIPTION OF THE PREFERRED EMBODIMENT

Figure 1:
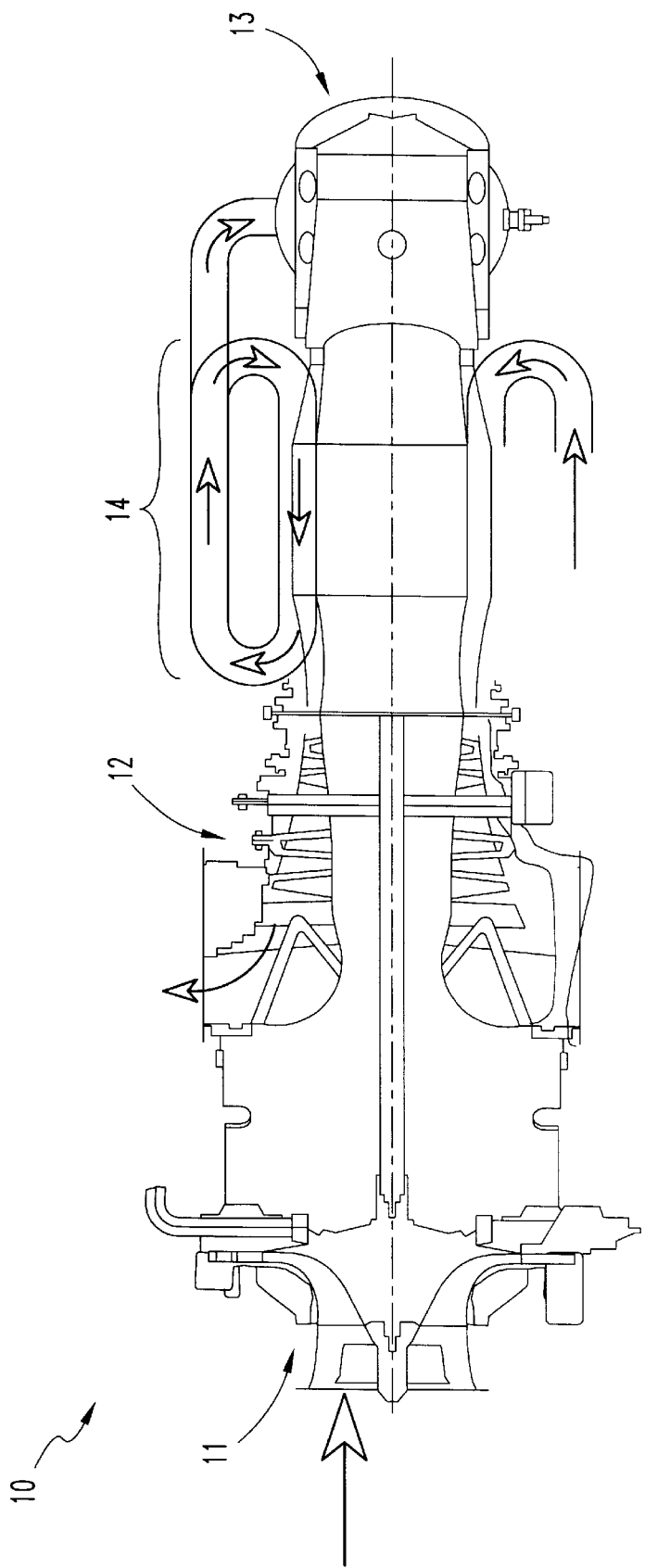
FIG. 1 is a illustrative side elevational view of a gas turbine engine having a forced purge wave rotor of the present invention coupled thereto.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, there is illustrated a gas turbine engine 10 which includes a compressor 11, a turbine 12, a combustor/burner 13, and a forced purge wave rotor 14. The three components have been integrated together to produce an aircraft flight propulsion engine. It is important to realize that there are a multitude of ways in which the components can be linked together. Additional compressors and turbines can be added with inner coolers connected between the compressor and reheat combustion chambers to be added between the turbines. Further, the gas turbine engine is equally suited to be used for industrial applications. Historically there has been wide spread application of industrial gas turbine engines, such as pumping sets for gas or oil transmission lines, electricity generation and naval propulsion.

Figure 2:
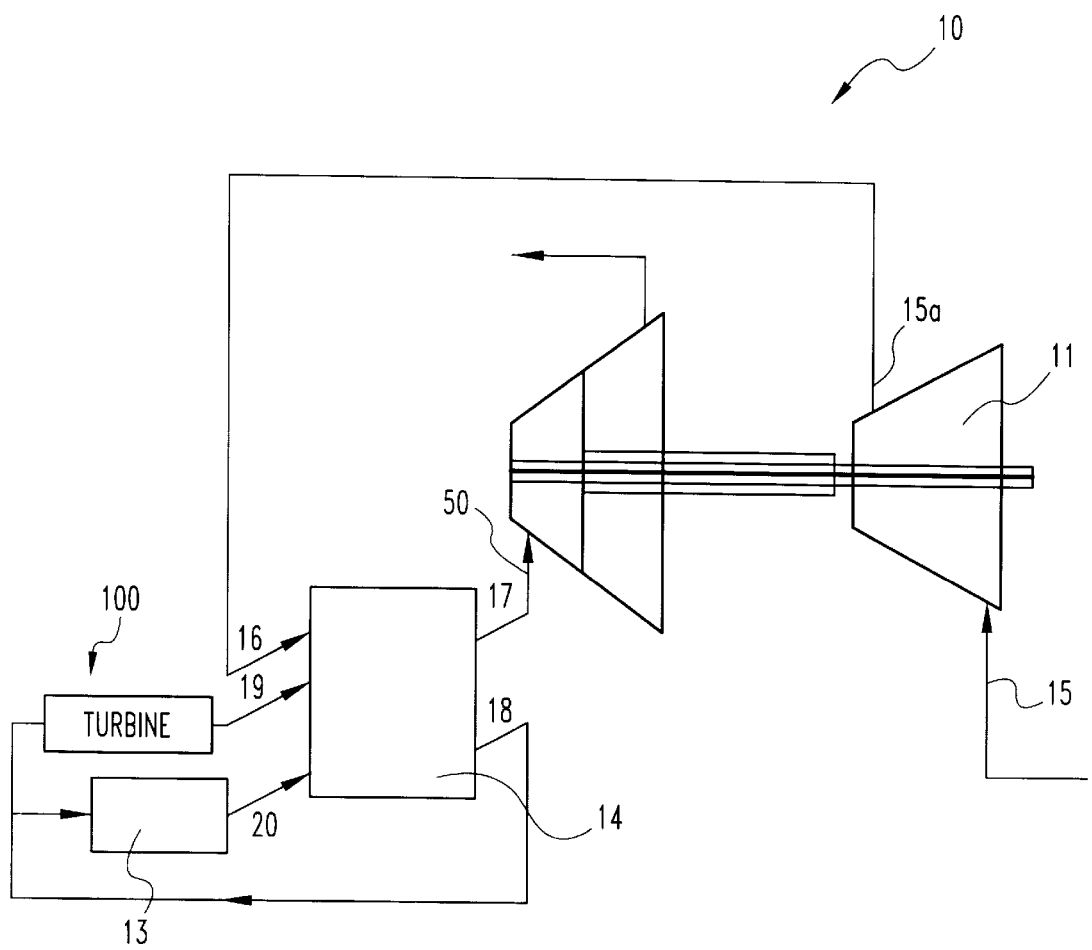
FIG. 2 is a schematic representation of the FIG. 1 gas turbine engine and forced purge wave rotor.

With reference to FIG. 2, there is a schematic representation of the gas turbine engine 10 with wave rotor 14 coupled thereto. The wave rotor 14 utilizes cyclic transient gas dynamic processes to top the engine's basic cycle (conventional Brayton gas turbine cycle) through the use of shock waves, expansion waves and hot to cold working fluid interfaces. To top a gas turbine engine includes providing additional compression following the last stage of conventional compression prior to the combustion process, and additional expansion prior to the first stage of conventional expansion.

Compressor 11 has a compressor inlet port 15 for receiving a working fluid flow therein. The compressor 11 operates in a traditional fashion to increase the pressure of the working fluid between the compressor inlet port 15 and a compressor outlet port 15a. It is understood that in the preferred embodiment the working fluid is a gas, and it is more preferred that the working fluid is air. The increase in working fluid pressure is represented by a pressure ratio (pressure at compressor outlet port 15a/pressure at compressor inlet port 15) and the pressurized working fluid is delivered via a duct to a wave rotor inlet port 16. A second wave rotor inlet port 20 provides a pathway for the introduction of working fluid from the combustor/burner 13 to the wave rotor 14. A third wave rotor inlet port 19 is referred to hereinafter as a purge inlet port, and is located adjacent to and sequentially prior to the wave rotor inlet port 16. It is understood that the wave rotor inlet ports 20, 19 and 16 form an inlet port sequence for the wave rotor topping cycle, and that multiple cycles can be integrated into a wave rotor apparatus. In the preferred embodiment there are two inlet port sequences disposed along the circumference of the wave rotor apparatus.

The wave rotor 14 has a pair of wave rotor exit ports 17 and 18 that facilitate the discharge of working fluid from the wave rotor. The first wave rotor exit port 17 is positioned generally opposite the wave rotor purge inlet port 19 and allows working fluid to exit the wave rotor through a duct and flow to a turbine inlet port 50. The second wave rotor outlet port 18 allows working fluid to exit the wave rotor and flow via a duct to the combustor/burner 13 and the wave rotor purge inlet port 19. Working fluid from exit port 18 is divided between the combustor/burner 13 and the wave rotor purge inlet port 19. The mass flow rate or working fluid from the wave rotor into the combustor/burner 13, in comparison to a device absent port 19, is thereby reduced. It is understood that the wave rotor outlet ports 17 and 18 form an outlet port sequence for the wave rotor topping cycle, and that multiple cycles can be integrated in a wave rotor apparatus. In the preferred embodiment there are two outlet port sequences disposed along the circumference of the wave rotor apparatus. The inlet port sequence and outlet port sequence are combined with a rotatable rotor to form the topping cycle. Further, the routing of the working fluid from the outlet port 18 to the combustor/burner 13 and the purge inlet port 19 utilizes the energy of the working fluid to increase fluid pressure and velocity, and more thoroughly purge and deliver the hot working fluid out of the wave rotor and into the turbine.

In one form of the present invention the portion of the working fluid exiting the outlet port 18 that is routed to the purge inlet port 19 must be brought to a pressure and may be brought to a temperature below the conditions existing at the outlet port 18. One method of reducing the pressure of this working fluid exiting outlet port 18 is to pass the working fluid through an orifice or duct so as to create frictional loses. Temperature reduction of the working fluid can be accomplished via conventional intercooling. Further, one form of the present invention utilizes a gas driven turbine device 100 to provide work extraction to reduce the pressure and temperature of the working fluid flowing to purge inlet port 19.

Figure 3:
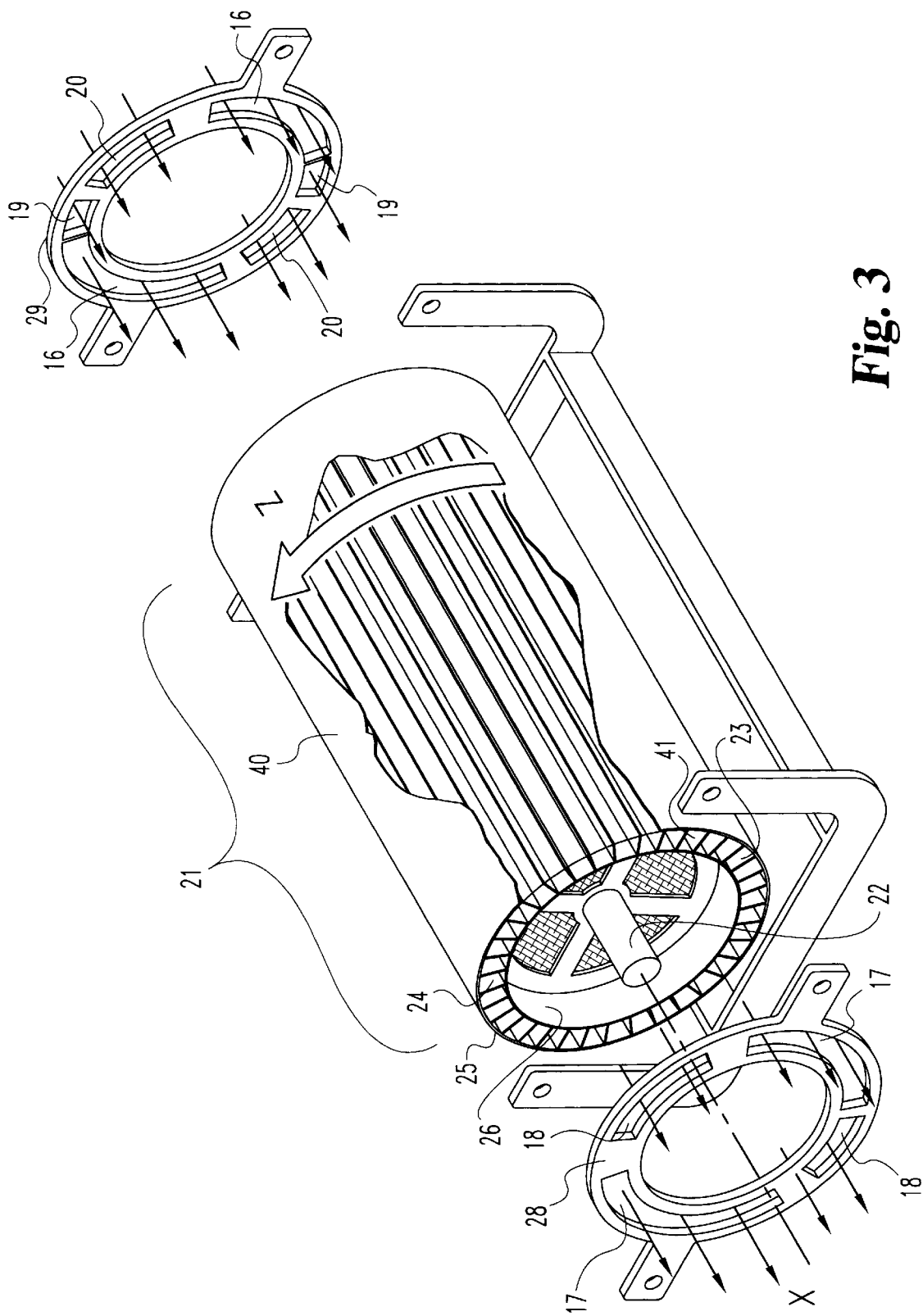
FIG. 3 is a perspective view of the forced purge wave rotor comprising a portion of FIG. 1.

With reference to FIG. 3, there is illustrated one embodiment of the wave rotor apparatus 21. Wave rotor apparatus 21 preferably comprises a cylindrical rotor 40 that is rotatable about a centerline X so as to pass a plurality of fluid passageways 23 by the plurality of inlet ports 16, 19, 20 and outlet ports 17, 18 that are formed in end plates 28 and 29. The end plates are coupled to the stationary ducted passageway between the wave rotor 21 and other engine components as illustrated in FIG. 2. The plurality of fluid passageways 23 are positioned about the circumference of the wave rotor apparatus 21. It is understood herein that in one embodiment the rotation of the rotor 40 is accomplished by conventional rotational devices within the contemplation of one of ordinary skill in the art. The gas driven turbine 100 can also be used as the rotational means to cause the rotation of the wave rotor 40. Further, in another embodiment the rotor is a self turning, free-wheeling design; wherein free-wheeling indicates no independent drive means. The types of rotational means are not intended to be limited herein and include other devices for rotating the rotor 40 within the comtemplation of someone of ordinary skill in the art. One form of the present invention utilizes rotational speeds in a range of about 1,000 to 50,000 revolutions per minute, and more preferably is about 17,000 revolutions per minute.

Transient gas dynamic processes within the rotating passageways 23 are set up by the abrupt exposure and closing of the ends of the plurality of passageways 23 to the environmental conditions existing at the respective port inlet and exit locations. The transient gas dynamic processes are designed to be compatible with steady flow devices utilized with the wave rotor 14 because the transient processes are cyclic within each of the plurality of passageway 23, and the use of a plurality of adjacent passageways 23 allows identical transient processes to occur in a time staggered phase relationship within adjacent passages.

The wave rotor 40 is fixedly coupled to a shaft 22 that is rotatable on a pair of bearings (not illustrated). In one form of the present invention the wave rotor 40 rotates about the centerline X in the direction of arrow Z. The direction Z may be concurrent with or counter to the rotation direction of the gas turbine engine rotors. The plurality of circumferentially spaced passageways 23 extend along the length of the wave rotor apparatus 21 parallel to the centerline X and are formed between an outer wall member 25 and an inner wall member 26. The plurality of passageways 23 define a peripheral annulus 24 wherein adjacent passageways share a common wall member 41 that connects between the outer wall member 25 and the inner wall member 26 so as to separate the fluid flow within each of the passageways.

A pair of wave rotor end plates 28 and 29 are fixedly positioned very closely adjacent the rotor 40 so as to control the passage of working fluid into and out of the plurality of passageways 23 as the rotor 40 rotates about centerline X. The wave rotor end plates 28 and 29 are located in a sealing arrangement with the rotor 40 so as to prevent the leakage of fluid from the plurality of passageways 23. Additional auxiliary seals (not illustrated) are included in one form of the present invention to increase the sealing efficiently. Seal types, such as but not limited to, labrynth glands or sliding seals are contemplated herein, however the application of seals to a wave rotor are believed known to a person of ordinary skill in the art.

Wave rotor end plate 29 is an inlet endplate and includes a plurality of circumferentially spaced wave rotor inlet ports. In the preferred embodiment a pair of inlet port sequences 20, 19 and 16 are formed therethrough. The opposite other wave rotor end plate 28 being an outlet endplate that has a plurality of wave rotor outlet ports 17 and 18 formed therethrough. In the preferred embodiment a pair of outlet port sequences 17 and 18 are formed therethrough. In one form of the present invention the working fluid transfer duct from the wave rotor exit port 18 to the purge inlet port 19 is integral with the wave rotor apparatus 21 and passes through the center of rotor 40, and more particularly through the center of shaft 22. In another form of the present invention the transfer duct is external to the wave rotor 40. The respective location of size of each of the inlet and outlet ports is determined by gas characteristics that are discussed with reference to FIGS. 4 and 5.

Figure 4:
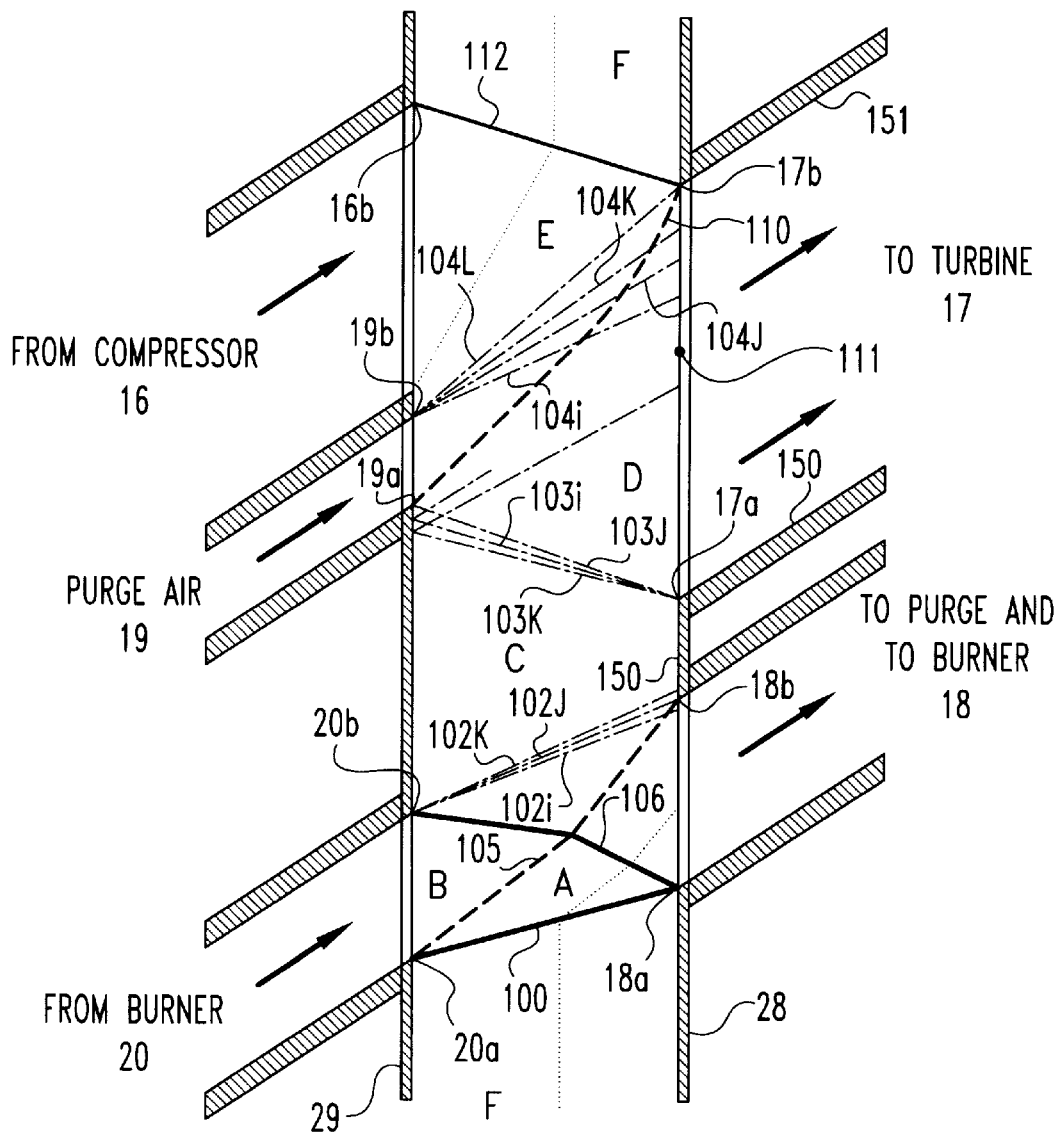
FIG. 4 is a space-time (wave) diagram for a through flow type forced purge wave rotor topping cycle.

With reference to FIG. 4, there is illustrated a wave diagram for a through flow type purge wave rotor topping cycle demonstrating the defining features of the forced purge wave rotor invention. From the description above, it can be seen that upon rotation of rotor 40, each of the plurality of passageways 23 are sequentially brought into registration with the inlet and outlet ports and the path of a typical charge of working fluid is along the respective passageway 23. The through flow type purge wave rotor topping cycle for the purpose of description may be started at any point.

Working fluid of relatively high temperature and pressure is introduced from the burner/combustor 13 to the passageway 23 through inlet port 20. Preferably, the working fluid is provided from burner/combustor 13 which functions to heat the working fluid provided thereto and is of a conventional design. Further, the wave speeds within the wave rotor 14 are sonic or higher, and the working fluid speeds are subsonic to near sonic.

Working fluid of relatively low temperature and pressure in region F is compressed by shockwaves 100 and 106 and forced out of the wave rotor through exit port 18. The working fluid in region A is allowed to exit through outlet port 18 while the passageway 23 is brought into registration therewith. The working fluid exiting the outlet port 18 has the highest pressure of any of the outlet ports. Upon exiting outlet port 18 the working fluid from region A is divided between the combustor/burner 13 and the purge inlet port 19.

A dashed line 105 represents a hot to cold working fluid interface between the hot working fluid region B and the lower temperature working fluid in region A. The rotation of rotor 40 brings the passageway 23 into registration with inlet port 20 and allows the introduction of the high pressure high temperature working fluid from the burner/combustor 13. Pressure and temperature conditions in passageway 23 and outlet port 18 allow the working fluid in region A to exit upon the registration of passageway 23 with outlet 18. A shock wave 100 emanates from the leading edge 20a of inlet port 20 and traverses through the passageway 23 to the opposite end plate 28 to define the leading edge 18a of the outlet port 18.

A second shock wave 106 is setup at the leading edge 18a of outlet port 18 and traverses back down the passageway 23, thereby raising the pressure of the working fluid in both the hot working fluid region B and the cooler working fluid region A. The second shock wave 106 continues through the passageway 23 to endplate 29 where it defines the trailing edge 20b of inlet port 20. Continued rotation of rotor 40 causes inlet port 20 to be closed and a plurality of expansion waves 102i, 102j and 102k (only three shown for illustrative purposes) to be created at the trailing edge 20b of the inlet port 20 and the plurality of expansion waves traverse through the passageway 23 to the endplate 28. The plurality of expansion waves 102i, 102j, and 102 k all start simultaneously from the trailing edge 20b of inlet port 20 and pass through passageway 23 to define the location of the trailing edge 18b of the outlet port 18. The simultaneous arrival of hot to cold working fluid interface 105 at 18b further defines the location of the trailing edge 18b of the outlet port 18. In another form of the present invention the outlet port 18 is closed earlier so as to allow for the passage of the lower temperature working fluid along surfaces 150. The passage of the lower temperature working fluid assists in cooling these structures. A region C within the passageway 23 comprises working fluid in a substantially quiescent state.

The continued rotation of the rotor 40 brings the passageway 23 into registration with outlet port 17. A plurality of strong expansion waves 103i, 103j and 103k (only three expansion waves shown for illustrative purposes) extended from the leading edge 17a of outlet port 17 through the passageway 23 to the opposite endplate 29. The contact place for the plurality of expansion waves 103i, 103j, and 103k defines a range of suitable positions for the leading edge 19a for the purge inlet port 19. The location of the leading edge 19a and the pressure associated therewith will determine whether a shock wave emanates from this point through region D. In one form of the present invention reflection of the expansion waves 103i, 103j, and 103k occurs at endplate 29 and the reflected waves traverse through the passageway in region D. The pressure at leading edge 19a is dependent upon the degree to which the pressure has been reduced by the arrival of the expansion waves 103i, 103j, and 103K. In one form of the present invention upon the passageway 23 being brought into registration with purge inlet port 19 a shock wave (emanating from point 19a towards points 111) traverses through the passageway 23 and is at least partially canceled by the reflected expansion waves 103i, 103j and 103k within region D. In another form of the present invention the pressure at leading edge 19a has not been reduced to a value to allow a shock wave to emanate from this point. The expansion accomplished by waves 102 and 103 together with the work exchange occurring after the flow enters from port 20, cause a temperature decrease of the working fluid exiting through outlet port 17.

A hot to cold working interface is represented by dashed line 110 that separates the working fluid into a hot working fluid region D and a cooler working fluid region E. Purge working fluid is admitted from the purge inlet port 19 and upon the closure of the purge inlet port 19 a plurality of expansion waves 104*i*, 104*j*, 104*k* and 104*l* (only four shown for illustrative purposes) emanate from the trailing edge 19*b* of the port. The plurality of expansion waves 104*i*, 104*j*, 104*k*, and 104*l* traverse through the passageway 23 and the hot working fluid in region D is expelled from the passageway until the hot to cold working fluid interface arrives at point 17*b*. Further, the location of the trailing edge 17*b* of the outlet port 17 is defined by where both the expansion waves 104 and interface 110 contact the endplate 28. In an alternate form of the present invention the cooling of surface 151 is accomplished by retarding the closing of outlet port 17.

With the continued rotation of rotor 40 comes the closing of the outlet port 17 which causes a shock wave 112 to traverse through the passageway 23 to compress the working fluid moving out of region E into region F. Further, the location of where shock wave 112 contacts endplate 29 defines the trailing edge 16*b* of inlet port.

The described sequence of wave and gas interface motions together with the prescribed port locations setting these sequences, causes the gas entering from port 20 and having passed through the combustor/burner 13 to be substantially expelled ultimately into port 17. A prior art device that omits port 19 allowed a large part of the gases entering from port 20 to not be expelled via port 17 but rather to move into region F. This gas then partially defeated the aforementioned self cooling feature and resulted in fluid expelled from port 18 to contain this hot fluid as a recirculating flow to the combustor 13.

The substantial elimination of recirculation of working fluid between the combustor/burner 13 and the wave rotor 14 causes a temperature decrease in outlet port 18 in the present invention. In an alternate form of the present invention some shift in port conditions can allow the delay of the arrival of the hot or cold fluid contact 110 at point 17*b* thus causing recirculation of working fluid back to the combustor/burner 13. This may be utilized for enhanced operation, however, the degree of working fluid recirculation can be controlled via port 19 flow to avoid the limitations imposed by high working fluid temperatures in transfer ducts or burner inlets.

Figure 5:
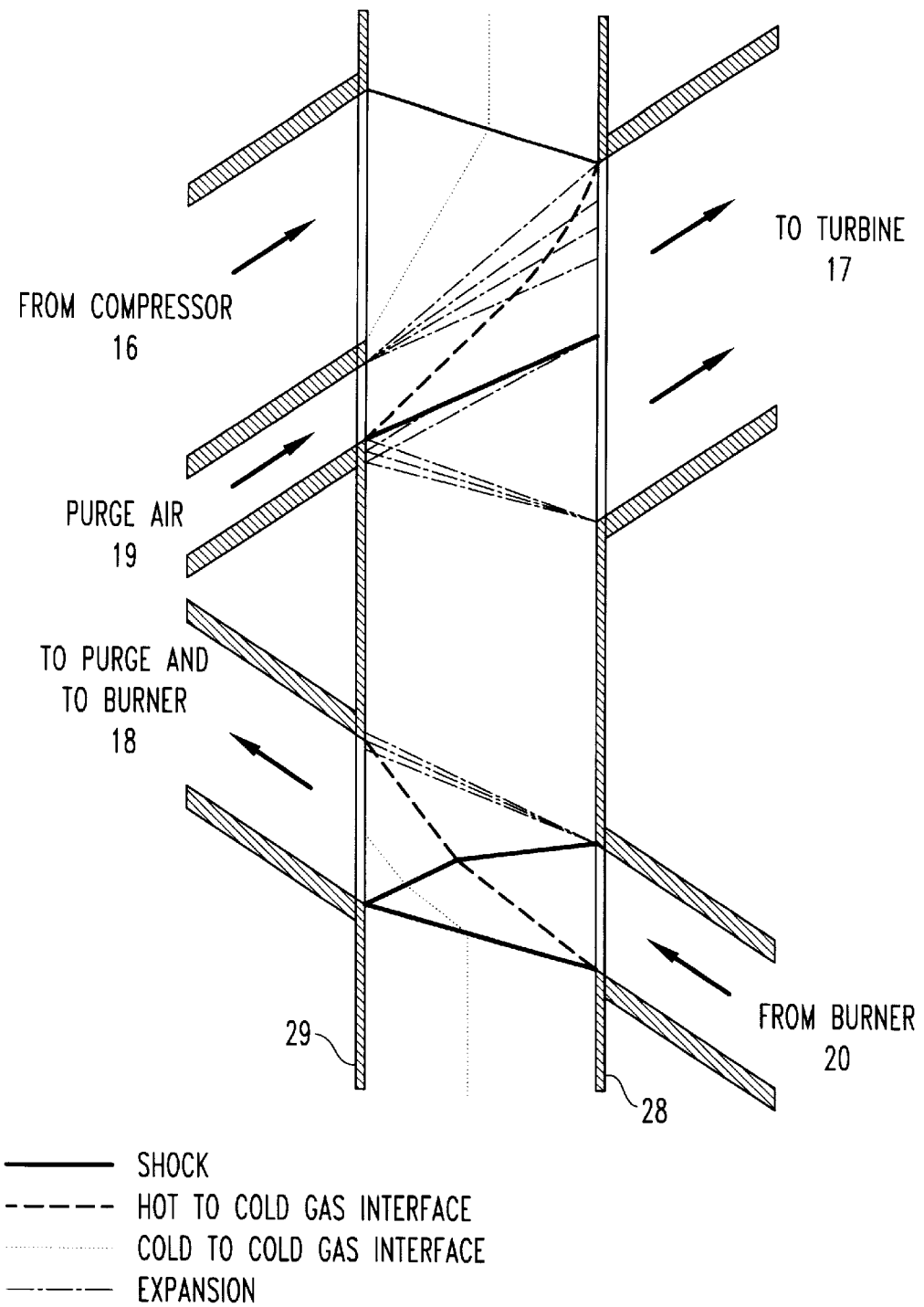
FIG. 5 is a space-time (wave) diagram for a reverse flow type purge wave rotor topping cycle.

With reference to FIG. 5, there is illustrated a wave diagram for a reverse flow type purge wave rotor topping cycle that is substantially similar to the wave diagram of FIG. 4. A reverse flow type purge wave rotor apparatus is substantially similar to the through flow type purge wave rotor that was described above. Changes to the wave rotor apparatus involve the relocation of the inlet port from burner 20 to endplate 28 and the relocation of the to purge and burner/combustor outlet port 18 to endplate 29. The remaining ports 19, 16 and 17 are left in the same relative location as for a through flow type forced purge wave rotor. The description of the wave and working fluid flow through the passageways 23 for the reverse flow type purge wave rotor topping cycle is substantially similar to that provided by FIG. 4.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of cooling a surface of a wave rotor comprising:

providing the wave rotor having a rotatable rotor with a plurality of fluid passageways for the passage of a working fluid therethrough, the wave rotor having a plurality of outlet ports through an outlet endplate for allowing the discharge of fluid from the wave rotor and a plurality of inlet ports for allowing the entry of fluid to the wave rotor, the outlet ports including a to-turbine port and a to-purge-and-burner port and the plurality of inlet ports including a from-burner port and a purge-inlet port;

rotating the rotor so as to sequentially pass the plurality of fluid passageways by the plurality of wave rotor ports; and closing the to-purge-and-burner port prior to arrival at the outlet endplate of a hot-to-cold interface between a hot working fluid entering the wave rotor through the from-burner port and a lower temperature working fluid existing within the wave rotor prior to entry of the fluid through the from-burner port; and opening the purge-inlet port to admit a purge fluid into the wave rotor while the to-purge-and-burner port is closed.

2. The method of claim 1, wherein the lower-temperature working fluid passes along a surface of the outlet endplate between the to-purge-and-burner port and the to-turbine port.

3. The method of claim 1, wherein the lower temperature working fluid passes along a surface of the to-turbine port.

4. The method of claim 3, wherein at least a portion of said surface is defined in a fluid passageway duct.

5. A method of cooling a surface of a wave rotor comprising:

providing the wave rotor having a rotatable rotor with a plurality of fluid passageways for the passage of a working fluid therethrough, the wave rotor having a plurality of outlet ports through an outlet endplate for allowing the discharge of fluid from the wave rotor and a plurality of inlet ports for allowing the entry of fluid to the wave rotor, the outlet ports including a to-turbine port and a to-purge-and-burner port and the plurality of inlet ports including a from-burner port, a purge-inlet port and a from-compressor port;

rotating the rotor so as to sequentially pass the plurality of fluid passageways by the plurality of wave rotor ports;

opening the purge-inlet port while the to-turbine port is open; and retarding closing of the to-turbine port until after arrival at the outlet endplate of a cold-to-hot interface between a relatively cooler working fluid entering the wave rotor through the purge-inlet port and a higher temperature working fluid existing within the wave rotor prior to the entry of the fluid through the purge-inlet port.

6. The method of claim 5, wherein the relatively cooler working fluid passes along a surface of the to-turbine port.

7. The method of claim 6, wherein at least a portion of the surface is defined within a fluid passageway duct.

* * * * *